United States Patent
Mitcham et al.

[11] Patent Number: 5,877,578
[45] Date of Patent: Mar. 2, 1999

[54] ROTOR DISC CONSTRUCTION FOR USE IN AN ELECTRICAL MACHINE

[75] Inventors: Alan J Mitcham, Ponteland; John Rickman, Cramlington; Colin J Grime, Culcheth, all of England

[73] Assignee: Rolls-Royce Power Engineering plc, Newcastle upon Tyne, England

[21] Appl. No.: 761,795

[22] Filed: Dec. 6, 1996

[30] Foreign Application Priority Data

Dec. 14, 1995 [GB] United Kingdom ............ 9525546

[51] Int. Cl.⁶ ......................................... H02K 1/22
[52] U.S. Cl. ........................... 310/268; 310/89; 310/90; 310/156; 310/266; 310/261
[58] Field of Search ................ 310/266, 268, 310/156, 89, 90, 261

[56] References Cited

U.S. PATENT DOCUMENTS

| | | | |
|---|---|---|---|
| 3,072,813 | 1/1963 | Reijnst | 310/156 |
| 4,663,551 | 5/1987 | Weh et al. | 310/152 |
| 4,864,175 | 9/1989 | Rossi | 310/156 |
| 4,918,831 | 4/1990 | Kliman | 29/598 |
| 5,015,901 | 5/1991 | Phelon et al. | 310/153 |
| 5,142,181 | 8/1992 | Newell | 310/268 |
| 5,159,220 | 10/1992 | Kliman | 310/156 |
| 5,162,686 | 11/1992 | Royer | 310/156 |
| 5,334,898 | 8/1994 | Skybyk | 310/268 |

FOREIGN PATENT DOCUMENTS

| | | | |
|---|---|---|---|
| 2 131 603 | 3/1995 | Canada | 310/153 |
| 642 204 | 3/1995 | European Pat. Off. | 310/153 |
| 2606951 | 11/1986 | France . | |
| 61-85045 | 9/1986 | Japan . | |
| 2062977 | 10/1980 | United Kingdom . | |
| 95/04399 | 2/1995 | WIPO | 310/153 |

*Primary Examiner*—Nestor Ramirez
*Assistant Examiner*—Elvin G. Enad
*Attorney, Agent, or Firm*—W. Warren Taltavull; Farkas & Manelli PLLC

[57] ABSTRACT

A rotor disc for use in an electrical machine has circumferential rotor rims mounted thereon. The rotor rim comprises a row of alternate magnets and pole pieces. The magnets are tapered at their radially inner and outer extents and engage with correspondingly tapered surfaces on adjacent pole pieces to prevent relative physical movement therebetween.

Each side of the radially inner and outer extents of the magnets may be tapered by a different amount to ensure correct orientation of the magnet polarity.

6 Claims, 3 Drawing Sheets

ROTOR DISC CONSTRUCTION FOR USE IN AN ELECTRICAL MACHINE

FIELD OF THE INVENTION

The present invention relates to a rotor disc for use in an electrical machine and in particular to the construction of an active rim on the rotor disc.

BACKGROUND OF THE INVENTION

Electrical machines which operate in accordance with transverse flux principles consist of an armature winding in the form of a circular coil co-axial with a rotor. The rotor consists of an active rim comprising a multiplicity of magnets and laminated poles, fastened to a rotor disc. The armature winding links the flux generated by the permanent magnets mounted on the rim of the rotor disc by means of a series of stator cores.

The rotor disc may support several rotor rims typically arranged in pairs on opposite sides of the disc. Each rotor rim is circumferential and may consist of a single row of magnets and pole pieces or a double row separated by an insulated spacer.

The retention of magnets in smaller transverse flux motors has been achieved by bonding using an epoxy resin or similar adhesive. Bonding is unsuitable for larger transverse flux motors as larger bending moments need to be taken by the magnets themselves.

The present invention seeks to provide a rotor rim having improved mechanical integrity so that the magnets are retained in the event of failure of the adhesive.

SUMMARY OF THE INVENTION

According to the present invention a rotor disc for use in an electrical machine has at least one circumferential rotor rim mounted thereon, the rotor rim comprises at least one row of alternate magnets and pole pieces, the radially inner and outer extents of the magnets are tapered to engage corresponding tapered surfaces on the adjacent pole pieces to prevent relative physical movement therebetween.

Preferably the radially inner and outer extents on each side of the magnets are tapered by a different amount to ensure correct orientation of the magnet polarity.

The magnets may be polygonal or a diamond shape and are subdivided to limit the generation of eddy currents therein.

Further mechanical interlocking may be provided by projections and/or recesses on the magnet which engage with corresponding recesses and/or projections on the adjacent pole pieces.

At least one of the projections and/or recesses between the magnet and one adjacent pole piece may be offset relative to the projections and/or recesses between the magnet and the other adjacent pole piece to ensure correct orientation of the magnet polarity.

BRIEF DESCRIPTION OF THE DRAWINGS

The present invention will now be described with reference to the accompanying drawings in which;

Referring to FIG. 1 a transverse flux motor, generally indicated at 10 comprises a rotor and a stator assembly.

Figure 1:
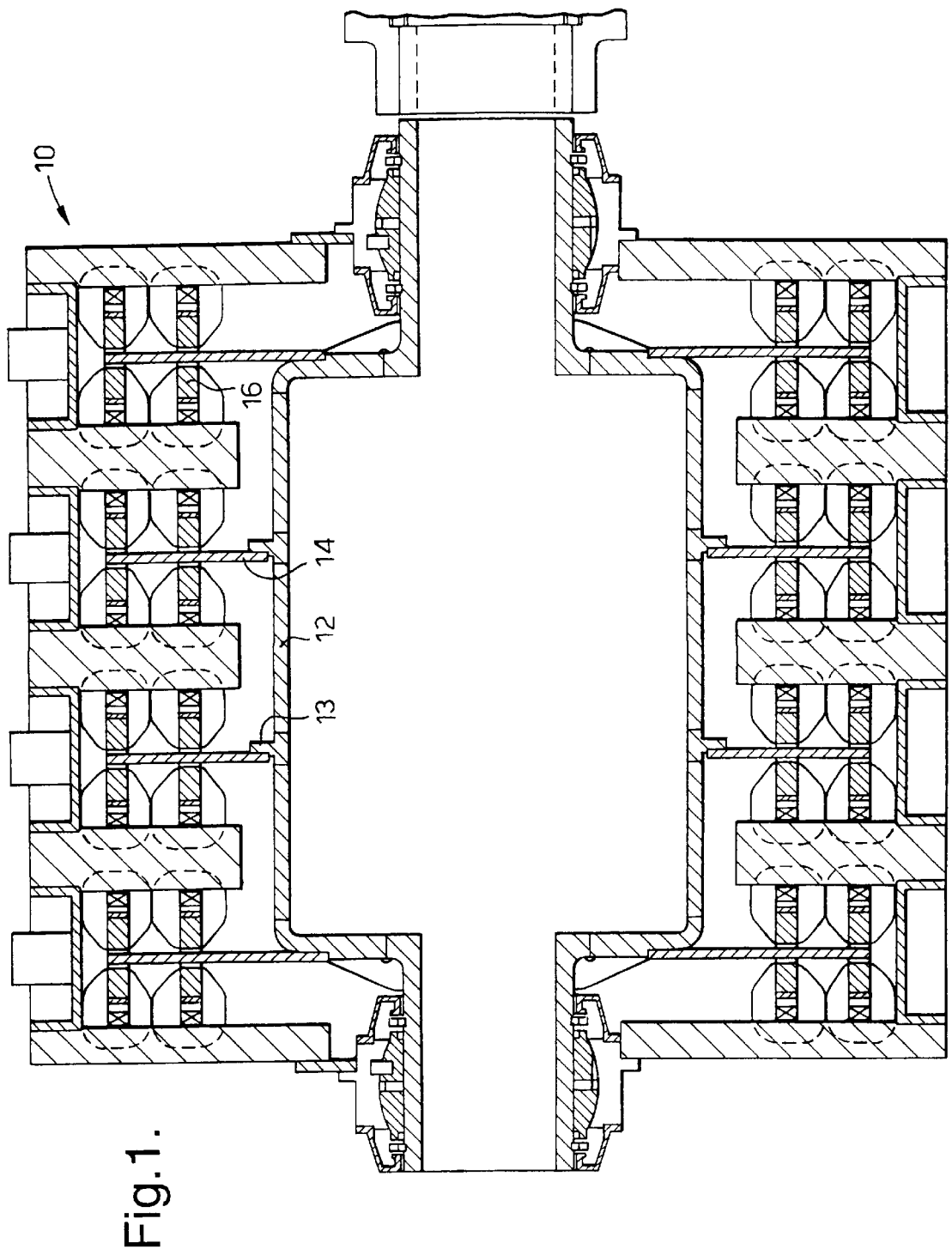
FIG. 1 is a cross-sectional view of a transverse flux motor having a rotor constructed in accordance with the present invention.

The rotor assembly has four rotor discs 14 bolted to flanges 13 on a hollow shaft 12. Each disc 14 has four circumferential rotor rims 16 which support the active rotor components for four motor phases.

Each rim 16 consists of a single row of alternate laminated pole pieces 18 and permanent magnets 20. Suitable magnet materials are the high energy rare earth magnet materials such as samarium cobalt and neodymium iron boron.

Figure 2:
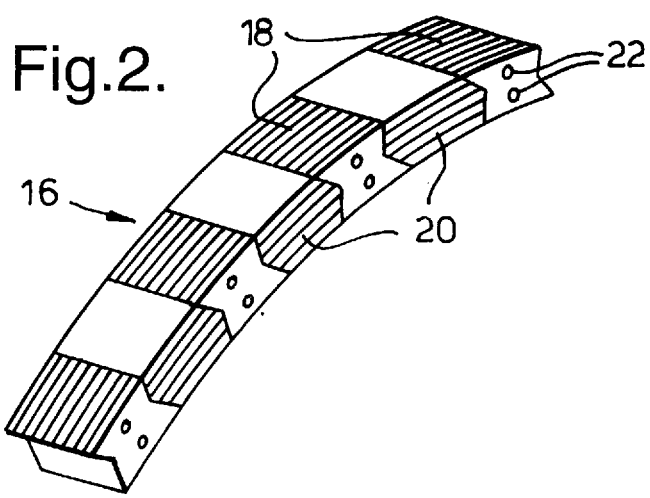
FIG. 2 is an enlarged view of part of one of the rotor rims shown in FIG. 1 having magnets retained in accordance with one embodiment of the present invention.

The magnets 20 are orientated in the circumferential direction as shown in FIG. 2. Every pole piece 18 delivers flux which is concentrated from two adjacent magnets 20. The pole pieces 18 are laminated and bolt holes 22 are provided through the stack of laminations through which bolts (not shown) pass to hold the stack together.

The magnets 20 are subdivided to reduce the generation of eddy current in the magnets 20. The subdivisions of the magnets 20 are bonded together.

The radially inner and outer extents of the magnets are tapered to engage with corresponding tapered surfaces on the adjacent pole pieces. The magnets are produced by bonding together differently shaped magnet elements to give the required shape or by bonding together elements of the same shape and machining into the required shape.

An adhesive resin is applied to the complete magnet 20 which is inserted between the pole pieces 18. The adhesive is cured to retain the magnet 20 in situ between the pole pieces 18.

In the event that the adhesive bond fails the tapered surfaces of the magnets 20 engage the correspondingly tapered surfaces of the pole pieces 18 to prevent relative movement between the magnets 20 and adjacent pole pieces 18.

Tapering the magnets 20 in the rotor rim 16 ensures retention of the magnets 20 in the event of failure of the adhesive resin and thus improves the mechanical integrity of the rim 16.

Figure 3:
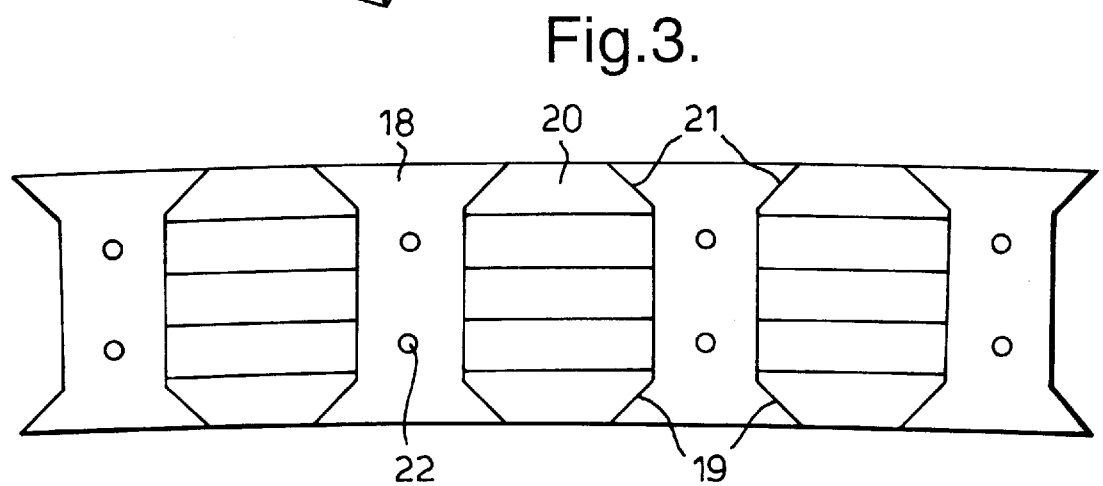
FIG. 3 is an enlarged view of part of one of the rotor rims shown in FIG. 1 having magnets retained in accordance with a second embodiment of the present invention.

The magnets 20 shown in FIG. 2 are diamond shaped. However it will be appreciated by one skilled in the art that other polygonal shapes may be used, FIG. 3, provided the radially inner 19 and outer 21 extents are tapered to provide sufficient mechanical interconnection between the magnets and adjacent pole pieces to prevent relative movement therebetween.

Figure 4:
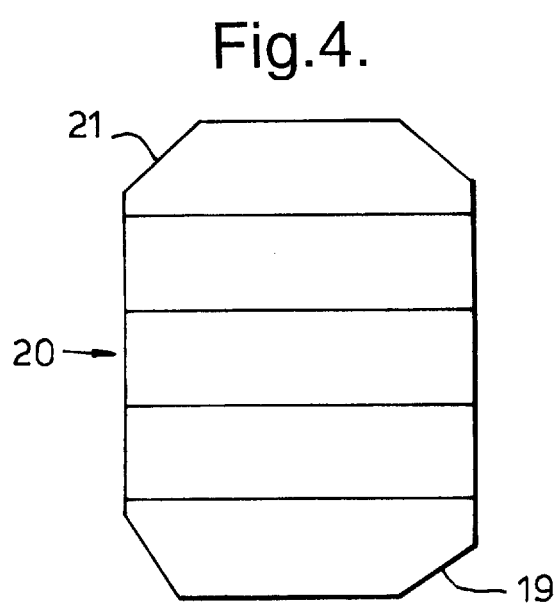
FIG. 4 is an enlarged view of one of the magnets in accordance with a third embodiment of the present invention.

FIG. 4 shows an alternative embodiment of the present invention in which the radially inner 19 and outer 21 extents on each side of the magnet are tapered by different amounts. Tapering each side of the magnet and the adjacent pole piece by a different amount ensures foolproof construction of the rotor rim 16 with the correct orientation of the magnet polarity.

Figure 5:
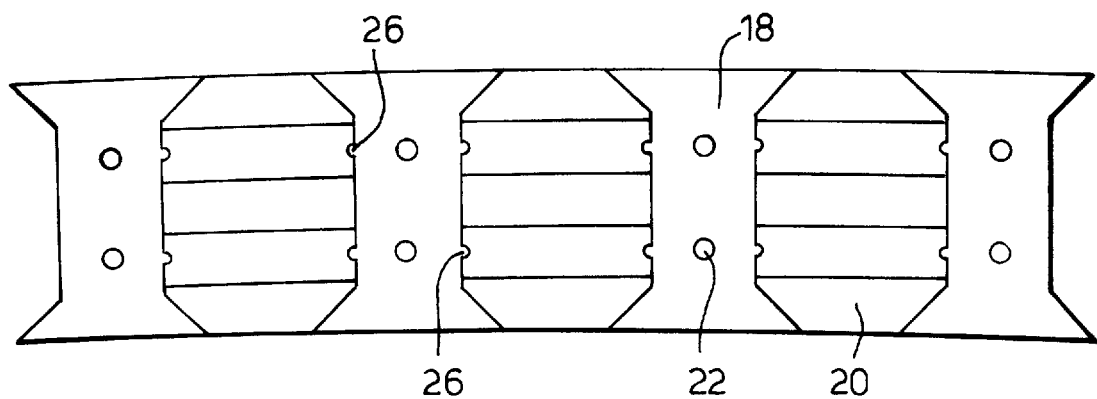
FIG. 5 is an enlarged view of part of one of the rotor rims shown in FIG. 1 having magnets retained in accordance with a fourth embodiment of the present invention.

FIG. 5 shows a further embodiment of the present invention in which the mechanical integrity of the rim 16 is further improved by providing projections 26 on the pole pieces 18 which locate in corresponding shaped grooves 28 in the magnets 20. Two projections 26 are provided on each side face of the pole pieces 18 which locate in two correspondingly shaped grooves 28 machined in the side faces of the magnets 20.

Figure 6:
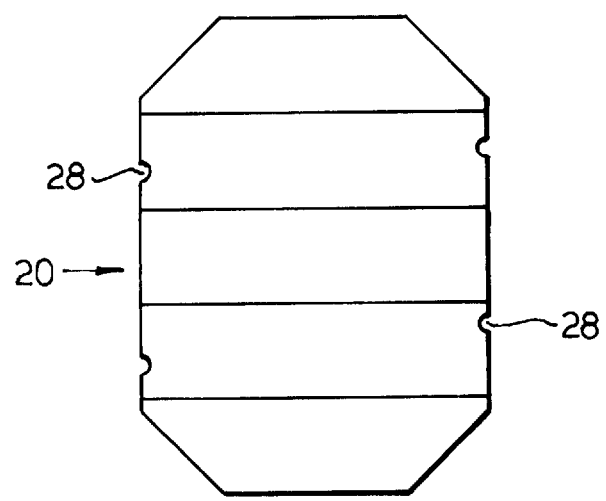
FIG. 6 is a enlarged view of one of the magnets in accordance with a further embodiment of the present invention.

In FIG. 6 at least one of the grooves 28 on one side of the magnet 20 is offset relative to the grooves 28 on the other side of the magnet 20. The projections 26 in the pole pieces 18 are correspondingly offset, not shown, so that the projections 26 on adjacent pole pieces 18 locate in the grooves 28. Offsetting at least one of the projections 26 and grooves 28 also ensures foolproof construction of the rotor rim 16 with the correct orientation of the magnet polarity.

It will be appreciated that the arrangement of the projections 26 and grooves 28 could be reversed or that each magnet 20 and pole piece 18 could have a combination of projections 26 and grooves 28.

We claim:

1. A rotor disc for use in an electrical machine having at least one circumferential rotor rim mounted thereon, said rotor rim comprising at least one row of alternate magnets and pole pieces, said magnets and pole pieces having interconnecting location portions which engage to prevent relative physical movement therebetween and having surface shapes on each side which are nonsymmetrical to ensure correct orientation of the magnetic polarity.

2. A rotor disc for use in an electrical machine having at least one circumferential rotor rim mounted thereon, said rotor rim comprising at least one row of alternate interconnecting location portions which engage to prevent relative physical movement therebetween and ensure correct orientation of the magnetic polarity, in which the interconnecting location portions are radially inner and outer extents of said magnets and said pole pieces which are tapered to engage with corresponding tapered surfaces on adjacent pole pieces, said radially inner and outer extents on each side of the magnets being tapered by different amounts to ensure said correct orientation of the magnetic polarity.

3. A rotor disc as claimed in claim 1, in which the magnets are polygonal.

4. A rotor disc as claimed in claim 1, in which the magnets are diamond shaped.

5. A rotor disc as claimed in claim 1, in which the magnets are subdivided to limit the generation of eddy currents therein.

6. A rotor disc for use in an electrical machine having at least one circumferential rotor rim mounted thereon, said rotor rim comprising at least one row of alternate magnets and pole pieces, said magnets and pole pieces having interconnecting location portions which engage to prevent relative physical movement therebetween and ensure correct orientation of the magnetic polarity, said interconnecting location portions being projections on one of said magnets and pole pieces which engage with corresponding recesses on the adjacent at least one of the magnets and one of the adjacent pole pieces, said projections and recesses between said magnets and adjacent pole pieces being offset relative to the projections and recesses between the magnet and other adjacent pole piece to ensure said correct orientation of the magnetic polarity.

* * * * *